(No Model.)
D. LIPPY.
PIPE COUPLING.
No. 409,473.  Patented Aug. 20, 1889.
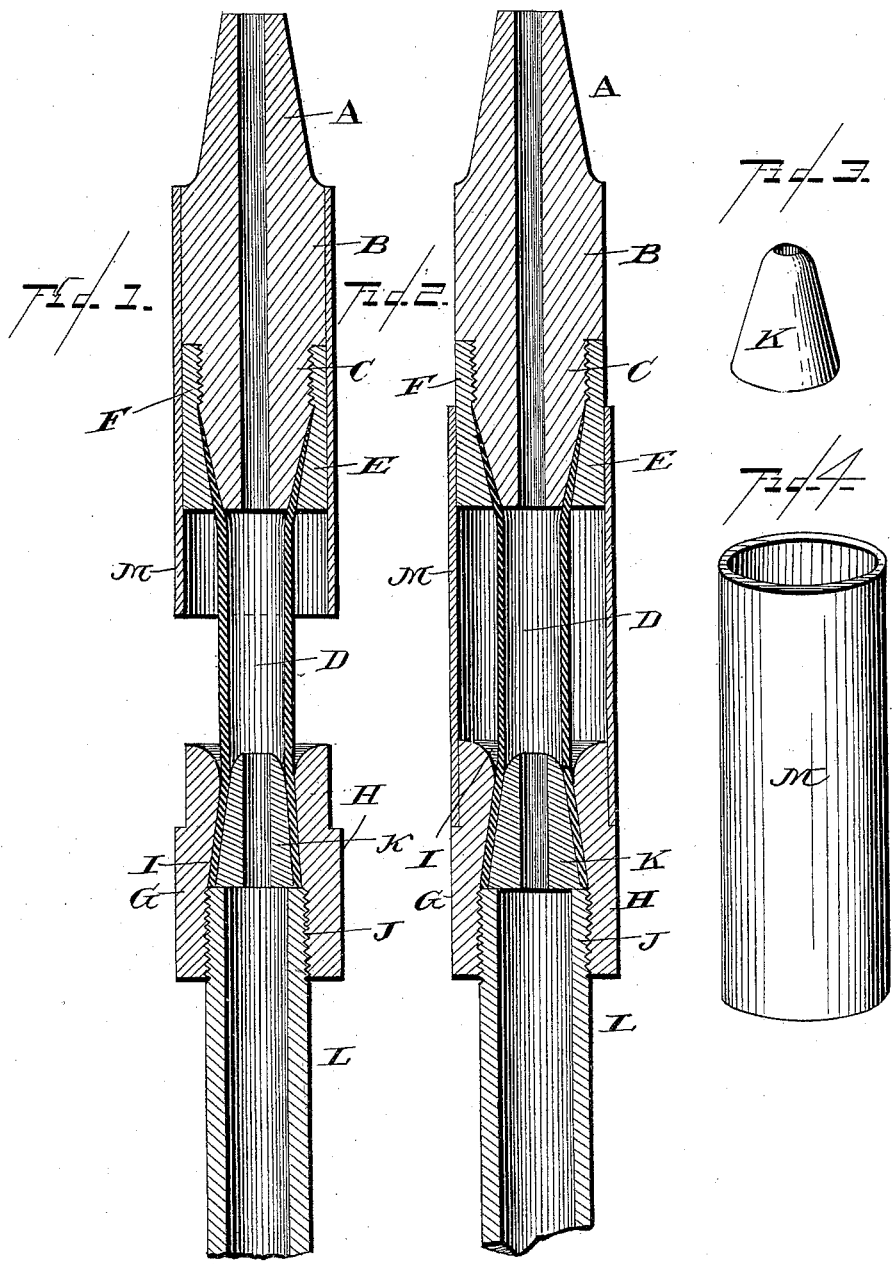
WITNESSES.
F. L. Ourand
A. L. Morsell
INVENTOR.
David Lippy
by J. Louis Bagger & Co.
Attorney

UNITED STATES PATENT OFFICE.

DAVID LIPPY, OF MANSFIELD, OHIO.

PIPE-COUPLING.

SPECIFICATION forming part of Letters Patent No. 409,473, dated August 20, 1889.

Application filed September 28, 1888. Serial No. 286,692. (No model.)

*To all whom it may concern:*

Be it known that I, DAVID LIPPY, a citizen of the United States, and a resident of Mansfield, in the county of Richland and State of Ohio, have invented certain new and useful Improvements in Pipe-Couplings; and I do hereby declare that the following is a full, clear, and exact description of the invention, which will enable others skilled in the art to which it appertains to make and use the same, reference being had to the accompanying drawings, which form a part of this specification, and in which—

Figure 1 is a longitudinal sectional view of my improved pipe-coupling, showing the outer cylindrical sleeve or adjusting-casing in position to admit of the connection being flexible. Fig. 2 is a similar view showing the sleeve in position to form a rigid connection. Fig. 3 is a detail view in perspective of the cone-shaped plug or tube, and Fig. 4 is a detail view of the adjusting sleeve or casing.

Like letters of reference denote like parts in all the figures.

My invention has relation to hose couplings or connections; and it consists in providing a connection which may be made either flexible or rigid, as desired, and in various other details of construction, as hereinafter more fully pointed out and described.

The object of my invention consists in providing a vertically-extending pipe adapted especially for street-watering purposes, composed partly of flexible material, so that the pipe may be bent or turned at any angle, and in furthermore providing an annular casing or sleeve for said flexible portion of the pipe for the purpose of protecting the same and to adapt it for the purpose of projecting a vertical stream only.

In the accompanying drawings, the letter A represents the nozzle or projecting ventage, provided with an annular flange or collar B, and having screw-threaded portion to the rear of this collar, (designated by the letter C.) The rear exterior surface of this nozzle gradually diminishes in diameter from the threaded part toward the end thereof, forming a cone-shaped or pointed end. A flexible tube D, of vulcanized rubber, leather, or other suitable material, is placed over this reduced end. A connecting-pipe E, having the bore thereof provided at F with screw-threads, said bore gradually decreasing in diameter from the threads toward the end thereof, is passed over the flexible tubing until the threads thereof engage with the male threads upon the end of the nozzle. As the connecting-pipe is screwed home it will have the effect of wedging the flexible pipe or tube securely between the outer surface of the end of the nozzle and the inner surface of the connecting-pipe, forming a most secure joint. A second connecting pipe or joint G is provided with an annular collar H on the outer surface thereof, and has one end flaring or provided with rounded or outwardly-curved inner ends or corners, the inner bore thereof gradually increasing in diameter for a certain distance from said flaring or rounded end, as shown at I. The opposite end of this second connection or joint is provided with female screw-threads J, and a cone-shaped tube K is disposed within said connection or joint. The end of the flexible tube D passes over this inner tube K between the outer surface thereof and the inner inclined surface of the connecting pipe or joint G. It will be seen that the diverging or rounded corners or ends of the connecting-pipe G are curved outwardly, while the apex of the cone-shaped plug forms inwardly-curved portions, thus preventing an abrupt joint with the textile fabric, hence decreasing the liability to tear.

The letter L represents the stand-pipe, provided with screw-threads upon the end thereof, which engage the female threads of the connecting pipe or joint G. When connection is made between the stand-pipe and said connecting pipe or joint, the cone-shaped tube D will rest upon the upper end of said stand-pipe, and in making such connection the flexible tube D is necessarily forced or wedged securely between the outer conical surface of the tube K and the inner tapering portion of the connecting pipe or joint G. A cylindrical casing or sleeve M is passed over the parts when connected from the nozzle end of the pipe, and when it reaches and bears against the annular collar H the pipe will be made perfectly rigid and the flexible tubular part thus thoroughly protected from injury. The hose, when employed with the cylindrical sleeve adjusted so as to protect the flexible portion thereof, will of course project a vertical jet. In order to make the pipe flexible, however, all that is necessary to be done is simply to slip the sleeve back or remove the same, which permits the pipe to be bent or turned at any angle, thus enabling a stream to be directed in any direction desired.

In pipes of the ordinary construction it is found exceedingly difficult to form a flexible connection which will withstand the wear upon the same and at the same time effect a secure and absolutely certain connection. By the construction above described, however, these disadvantages are overcome, inasmuch as I attain not only a secure and effective coupling, but also am enabled to couple in such a manner as to render the liability of wear upon the connecting ends of the flexible tube exceedingly slight.

Having thus described my invention, I claim and desire to secure by Letters Patent of the United States—

The combination of the nozzle, the flexible tubing connected thereto, the connecting pipe or joint, and the lower connecting pipe or joint provided with an annular collar or shoulder, and the exterior cylindrical casing or sleeve, substantially as set forth.

In testimony that I claim the foregoing as my own I have hereunto affixed my signature in presence of two witnesses.

DAVID LIPPY.

Witnesses:
ARTHUR L. MORSELL,
GEORGE A. WOOSTER.